W. E. WILLIAMS.
MACHINE FOR MAKING SHREDDED WHEAT BISCUITS.
APPLICATION FILED JAN. 29, 1908.
949,013.
Patented Feb. 15, 1910.
6 SHEETS—SHEET 2.
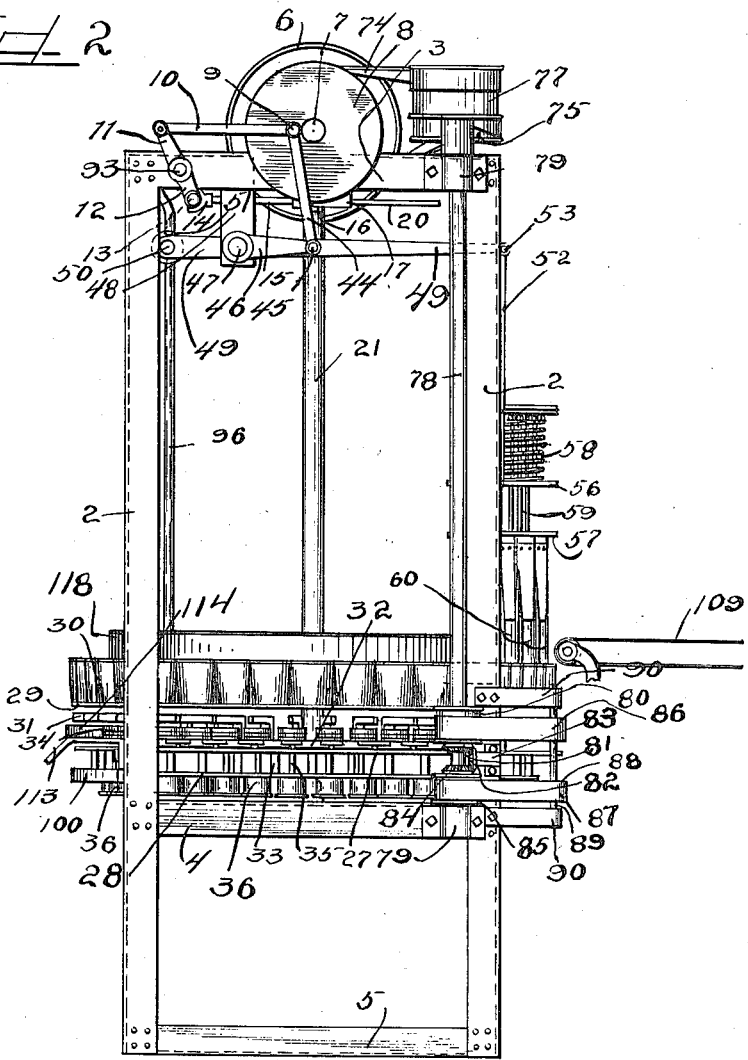
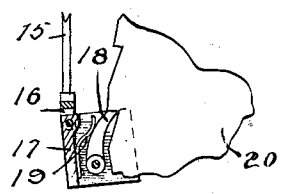

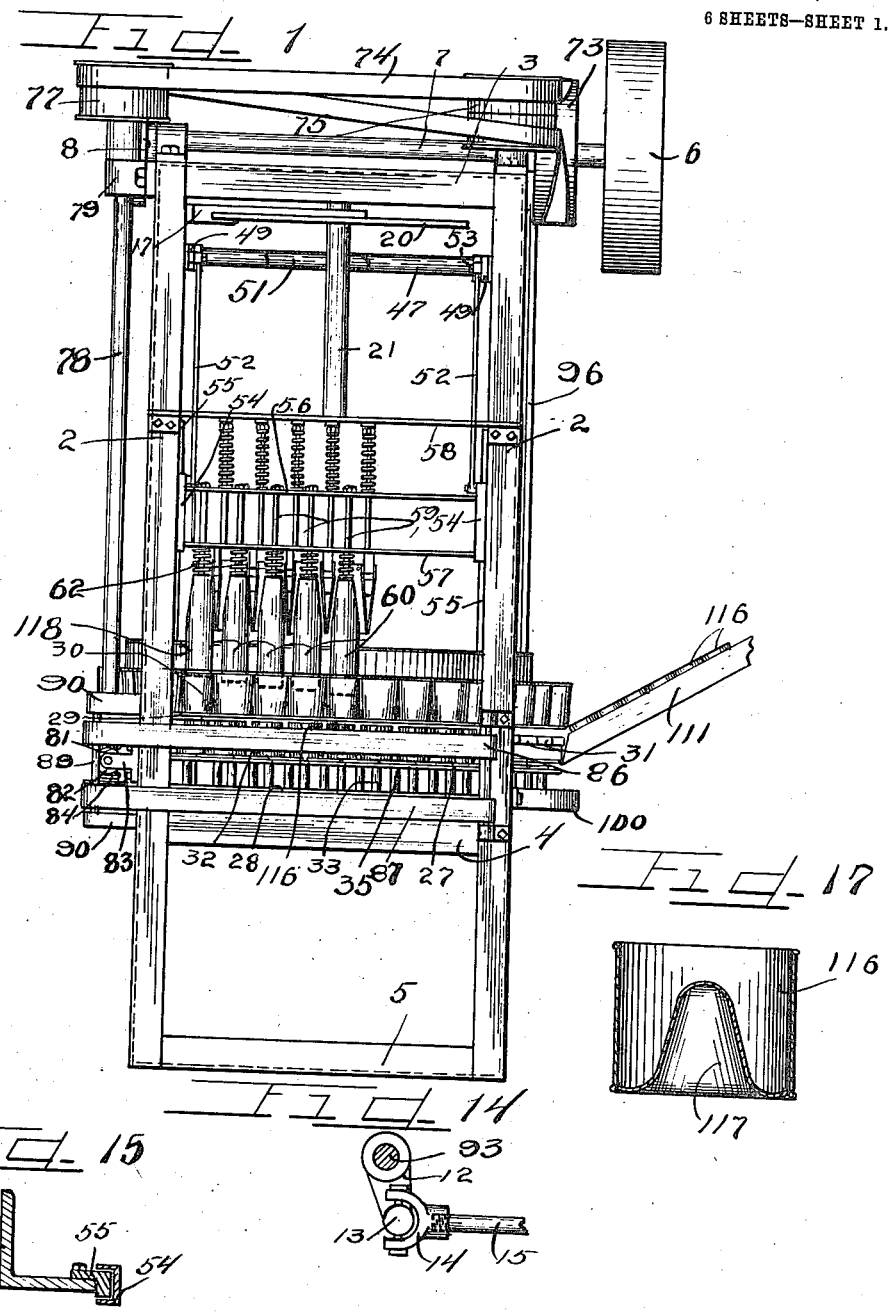

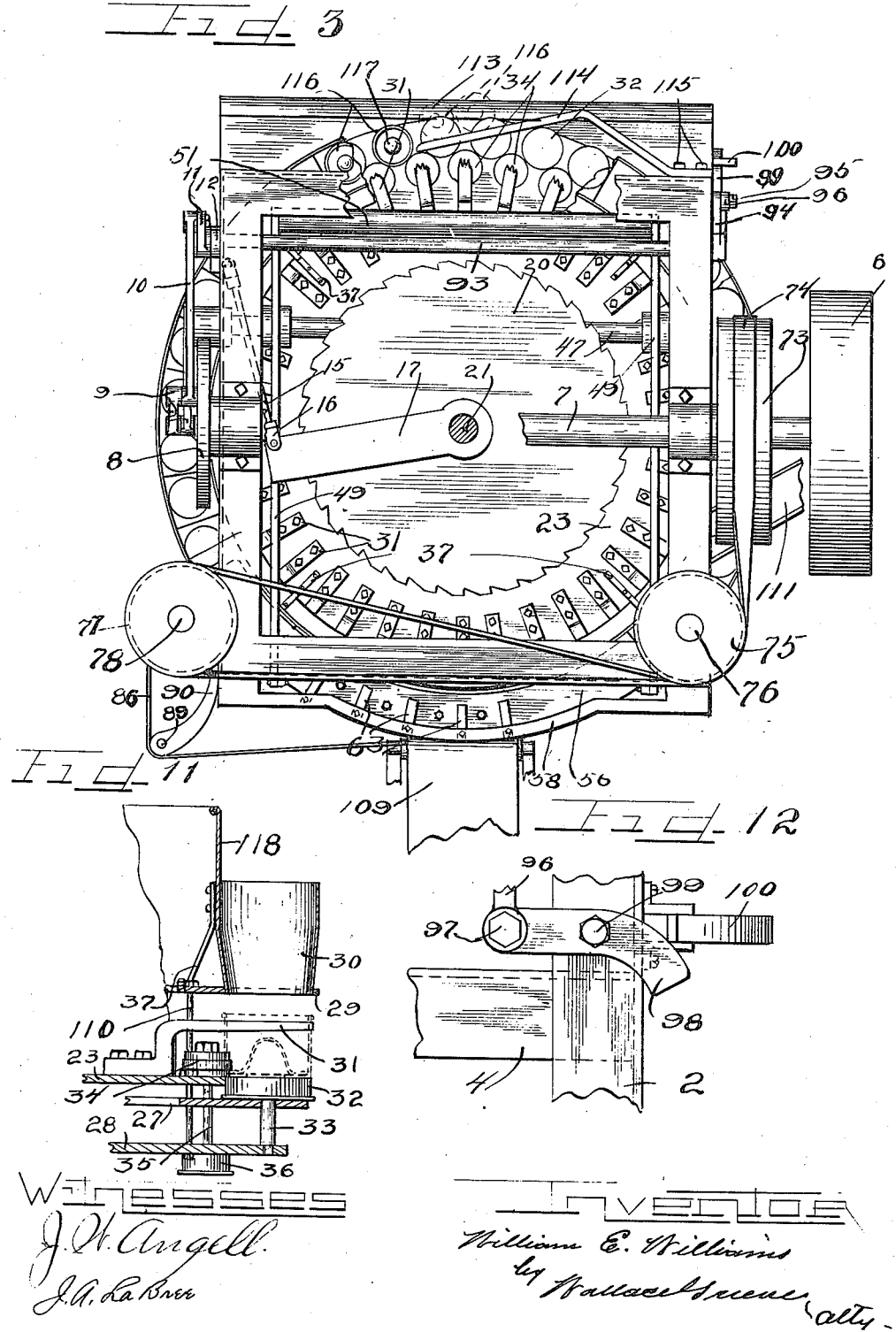

W. E. WILLIAMS.
MACHINE FOR MAKING SHREDDED WHEAT BISCUITS.
APPLICATION FILED JAN. 29, 1908.
949,013.
Patented Feb. 15, 1910.
6 SHEETS—SHEET 4.
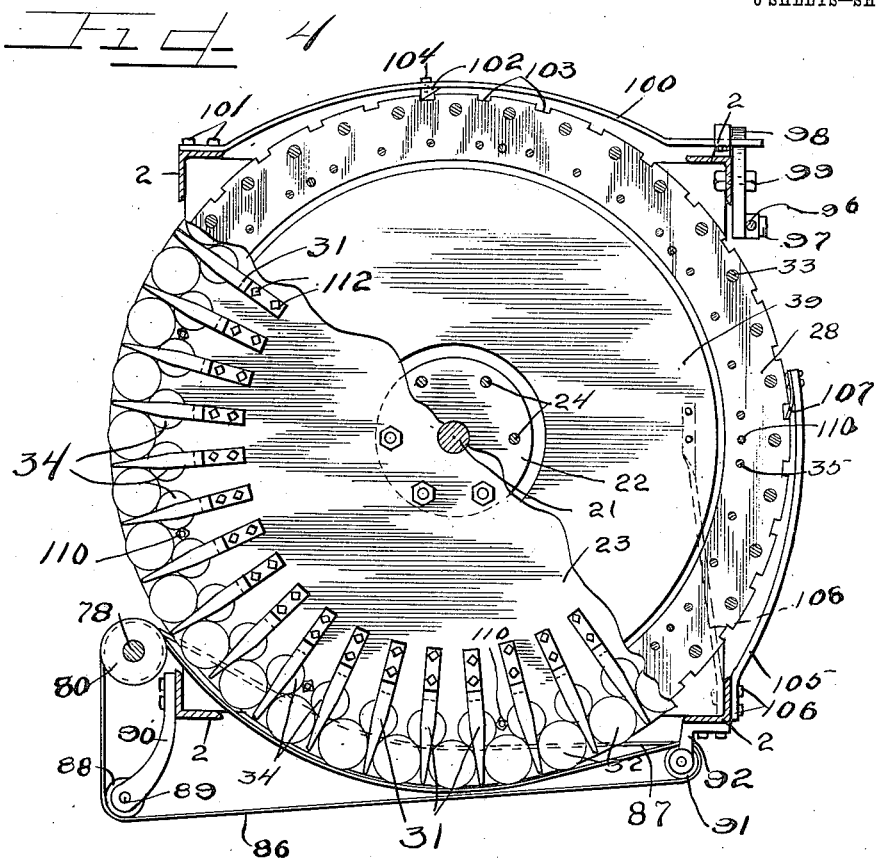
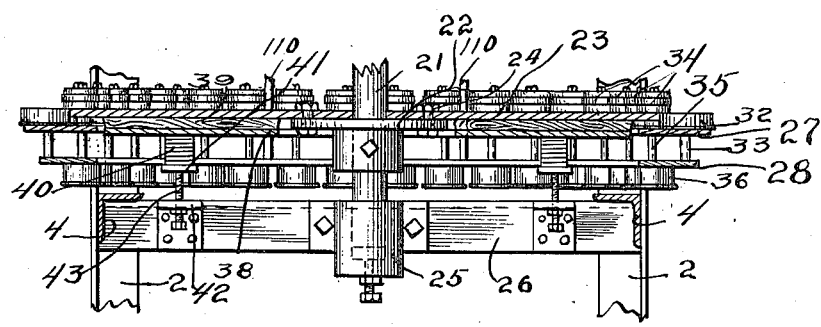
WITNESSES
J. W. Angell.
J. A. LaBrer.
INVENTOR
William E. Williams
by Wallace Greene,
Atty.

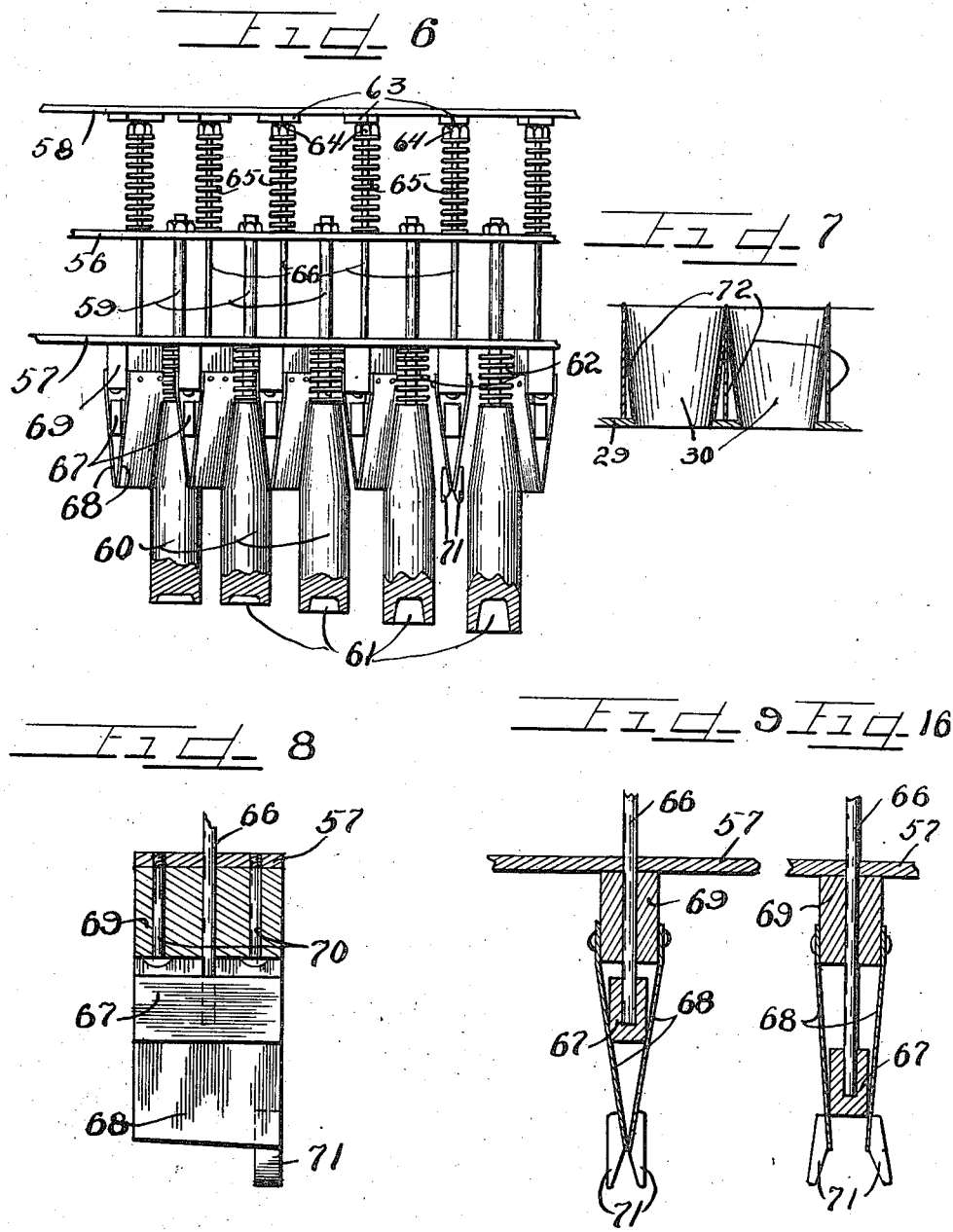

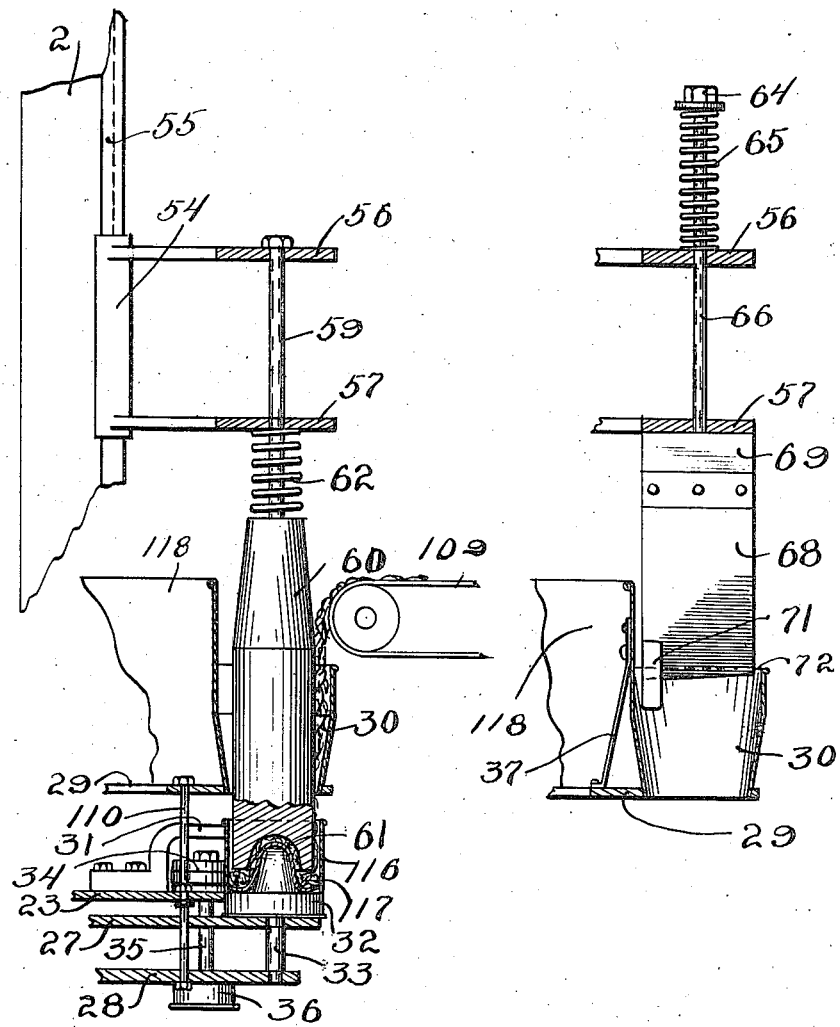

UNITED STATES PATENT OFFICE.

WILLIAM ERASTUS WILLIAMS, OF CHICAGO, ILLINOIS.

MACHINE FOR MAKING SHREDDED-WHEAT BISCUITS.

949,013.  Specification of Letters Patent.  Patented Feb. 15, 1910.

Application filed January 29, 1908. Serial No. 413,279.

*To all whom it may concern:*

Be it known that I, WILLIAM ERASTUS WILLIAMS, a citizen of the United States, residing at Chicago, in the county of Cook and the State of Illinois, have invented a new and useful Improvement in Machines for Making Shredded-Wheat Biscuits, of which the following is a specification.

This invention has for its object to make automatically a cup shaped biscuit or a round biscuit out of any shredded or fibrous material such as shredded wheat, grain, codfish or any other suitable material.

Reference will be had to the accompanying drawings in which:

Figure 1 is a vertical elevation of the machine on the side at which it receives the material that it operates upon to form the cup-shaped biscuits. Fig. 2 is a vertical elevation corresponding to the left side of Fig. 1. Fig. 3 is a top plan view with certain parts broken away to show those below. Fig. 4, is a plan sectional view with parts broken away as will be understood by reference to the corresponding parts in Figs. 1 and 2. Fig. 5 is a vertical sectional detail of certain parts of the base of the machine. Fig. 6 is a vertical detail of the packing plungers. Fig. 7 is a vertical detail of the receiving hoppers for the shreds. Fig. 8 is a sectional detail of one of the cutting plungers. Fig. 9 is a view similar to that of Fig. 8 but at right angles thereto. Fig. 10 is a vertical sectional view through the axis of the delivery belt. Fig. 11, on the same sheet with Fig. 3, is a vertical sectional detail. Fig. 12 (Sheet 3) is a vertical detail of the locking mechanism. Fig. 13 (Sheet 2) is a plan detail of the ratchet movement that drives parts of the mechanism. Figs. 14 and 15 on Sheet 1 are details that will be described later. Fig. 16 is a detail of the cutting plungers. Fig. 17 is a sectional view of the cups or forms. Fig. 18 is a detail view of a certain cross bar and blocks shown also in Figs. 3 and 6.

The machine is provided with a suitable frame made of members of angle section, 2, 3, 4, 5, and 26.

Fig. 17 is a cup or form into which the shreds are placed by the machine and which holds them till they are baked or dried and thereby set sufficiently to keep the shape given them by the form. This cup or form 116 is provided with a cone shaped central projection 117 in its bottom, around and over which the shreds are placed by the machine in an interlacing manner extending upward, downward and obliquely of the cone shaped bottom and at the same time in a general direction around the cup and also inward and outward from the center toward the rim whereby the biscuit thus formed is bound together and yet the shreds are not packed tightly but left open and interstitial. The cups 116 are usually made of tin and are supplied to the machine from a magazine not shown, by a chute 111 and the function of the machine is chiefly to handle these cups and pack the material therein which material is delivered to the machine by the moving carrier belt 109 coming from a shredding machine or other suitable source of supply of the shreds. The shreds lying, as nearly as practicable, lengthwise of the carrier belt are discharged endwise into the hoppers 30 of the machine which hoppers 30 are arranged in a ring supported on a ring shaped disk 29 forming a part of a wheel carried on a vertical shaft 21. The hoppers 30 are spaced apart in the ring the right distance to suit the size of the cups 116 whereby the wheel carrying the hoppers 30 may receive a continuous line of cups 116 from the chute 111 and hold the cups 116 apart from each other by fingers 31 which are fastened by screws 112 to a plate 23 which is the main plate or body of the wheel and to which many other parts are fastened, which plate is fixed by screws 24 to a flange, 22, Fig. 4 fixed to shaft 21 supported in a step bearing 25 on cross member 26 of frame. The cups 116 are thus carried around by the wheel underneath the delivery of the carrier belt 109 and while underneath the said delivery receive a sufficient quantity of shreds to form the biscuits desired and are finally discharged by an arm 114 fixed by screws 115 to the frame 2 of the machine. A guide plate 113 directs the discharged cups into any suitable receiving device. The cups 116 are revolved during the time that they receive the shreds in order to interlace the shreds and to do this revolving there are provided rotating disks 32 upon which the cups 116 set as they are carried around by the wheel. These disks are seated in cavities in plate 23, and are supported by spindles 33 journaled in a lower disk ring 28 and also supported in an upper disk ring 27, both of which rings, 27 and 28, are fixed by studs 110 to plate 23. At the back of disks 32 and above the plate 23 there are rollers 34 so arranged as to location that they engage the cups 116 as they set concentrically upon disks 32 and these rollers 34 are fixed upon shafts 35, journaled in plates 23, 27 and 28, and carrying drive pulleys 36 which are driven by a belt 87. A belt 86 engages the disks 32 and the cups 116 themselves so that the cups are engaged on the bottom and at 3 points on their sides by driving members so that they revolve during the time that they receive the shreds.

The shreds of grain are light and are usually long sometimes almost continuous strings, so that they do not drop readily into the cups 116 but must be forced down into place, and this is accomplished by a series of plungers or packers 60 mounted upon a vertically reciprocating cross head composed of the plates 56 and 57 connected together by members 54 which engage the guides 55 fastened to frame 2. The wheel which carries the cups is given an intermittent movement which permits the plungers 60 to descend into the cups 116 and force the shreds down out of the hoppers 30 into the cups or forms in the proper form desired and the ends of the plungers 60 are provided with cavities 61, which are so shaped as to give the proper form to the shreds in the cups at each stage of the filling of the same, the delivery belt 109 being wide enough to deliver into several hoppers 30 and cups 116 simultaneously and as the wheel moves by impulses the distance of one full space of a cup at a time each cup will receive several impacts of the plungers while being filled and some of the plungers are located beyond the points of delivery of the shreds to the cups to give a finish to the shape of the shreds in the cup which shreds are then properly biscuits. The plungers 60 are made round or cylindrical and engage the shreds on all sides of the central cone of the cup, at the same time preventing the drawing up of the shreds over the top of the cone on one side while they are being pushed down on the other side.

Since the shreds are often continuous strings and the supply on the carrier 109 is endless the shreds will extend over the top of one hopper 30 into that of its neighbor owing to the moving of the wheel carrying the hoppers past the points of delivery of the shreds to them. And to cut these shreds clear from hopper to hopper there are provided cutting walls 72 between the hoppers 30 and coacting therewith there are reciprocating cutting plungers composed of the cutting plates 68 fastened to blocks 69 which are fastened by screws 70 to plate 57 of cross head before mentioned that carries the packing plungers 60. The plates 68 on the descent of the cross head embrace each side wall 72 of hoppers 30 and thereby cut and force down into hoppers any shreds that hang over the division walls 72 of the hoppers.

In the cutting of the shreds by the plungers as described some shreds will stick to the plates 68 and be lifted up as the plungers rise and to free these shreds there are provided the blocks 67 mounted upon rods 66 which slide through the plates 56 and 57 and terminate in a nut or cap 64 against which a spring 65 resting on plate 56 keeps blocks 67 in an upper position at all times save only when the cross head is at its upward limit of travel when the nuts or caps 64 engage fixed blocks 63 mounted upon a fixed cross bar 58 and thereby the blocks 69 are forced downward between plates 68 spreading them apart and stripping the shreds off their ends. (See Fig. 16.) On the return downward of the plungers the springs 65 withdraw blocks 67 to a normal position as shown in Fig. 9.

The inside lower corners of plates 68 of cutting plungers are provided with guide blocks 71 which insures proper registry of the cutting plungers with the cutting walls 72 of the hoppers to allow slight variations in the registry of the hoppers at each impulse of movement of the wheel carrying them.

The plungers or packers 60 are mounted upon rods 59 sliding in plates 56 and 57 of the cross head and springs 62 acting between the plungers 60 and plate 57 provide for an elastic contact with the shreds in the cups 116, preventing too great a mashing of the shreds in the cups and also insures against breaking the parts in the event of a derangement of the timing of the machine.

The machine is driven by a belt wheel 6 driving a shaft 7 which carries a crank plate 8 carrying a wrist pin 9 connected by a rod 10, to an arm 11, mounted upon a rocker shaft 93 supported by boxes fixed to frame 2 and rocker shaft 93 carries an arm 12 provided with a wrist pin 13 carrying a universal joint 14 connected by a rod 15 to a joint 16 on a rocker arm 17 journaled on vertical shaft 21 (on which is mounted the cup carrier wheel) and provided with a pawl 18 held by a spring 19 into contact with ratchet teeth of a large ratchet 20 whereby on each revolution of the belt wheel an impulse equaling the distance of one cup on the carrier wheel is given the cup carrying wheel and its parts. The impulses given the cup carrying wheel are quick and jerky and to insure close registration of the hoppers and cups with the packing and cutting plungers there is provided a locking catch or stop 102 (Fig. 4) fixed at 104 to a spring arm 100 screwed at 101 to frame 2 and this catch or stop 102 engages notches 103 in ring 28 and is released therefrom at the beginning of each movement of carrier wheel by a cam block 98 (see Fig. 12), mounted upon a pin 99 and connected at 97 to a rod 96 connected to a wrist pin 95 in an arm 94 fixed on rocker shaft 93. Whereby at the back stroke of pawl arm 17 the catch 102 is released from the notches 103 in plate 28 of the carrier wheel then on the forward movement of arm 17 during which the carrier wheel is moving the catch 102 is allowed to come into engagement with notches 103 in time to prevent the movement of the wheel carrying it too far. Backlash is prevented by another spring catch 107 on arm 105 fixed at 106 to frame 2 and this catch is disengaged by the movement of the wheel itself.

The shock of stopping the carrier wheel is lessened by means of a friction disk brake 38 having friction blocks 39 placed up against the under side of the wheel plate 23 and held in elastic adjustment thereto by the springs 40 resting on blocks 41 and screws 43 in blocks 42 (see Figs. 4 and 5), and the disk is held against rotation by arms 108 shown only in dotted lines in Fig. 4. Thus by the above disk brake the wheel is prevented from too free a movement thereby saving some of the shock of stopping it.

The cross head carrying packing plungers and cutting plungers is vibrated by the former mentioned wrist pin 9 connected by a link 44 to a wrist pin 45 of an arm 46 connected to a rocker shaft 47 mounted in suitable bearings 48 fixed to frame of machine and rocker shaft 47 carries arms 49 connected at 53 to rods 52 connected to the cross head before mentioned. Consequently on each impulse of the cup carrying wheel the plungers descend to pack the material and cut it at the division walls of the hoppers. The plunger cross head is counter balanced on the rocker shaft 47 by a weight 51 fastened at 50 to arms 49.

Motion is given to the belts 86 and 87 by means of the belt wheel 73 engaging and driving the belt 74 which is trained around two guide pulleys 75 on a shaft 76 over a pulley 77 on a vertical shaft 78 which is supported in bearings 79 and carries a fixed pulley 85 on its lower end and also a bevel gear 84 which gear engages a gear 82 mounted upon a stud 83 and running idle thereon and engaging a gear 81 fixed to a pulley 80 which is loosely mounted on shaft 78 whereby shaft 78 drives pulley 85 in one direction and pulley 80 in an opposite direction.

The belt 86 before mentioned passes around pulley 80 and then over an idler 88 on a stud 89 in brackets 90, then around a pulley 91 supported by brackets 92 and then back along the carrier wheel rim engaging the tin cups or forms 116 and disks 32 and thereby rotating them back to and around the pulley 80 as described. The belt 87 passes around the pulley 85, then over an idler 88 on stud 89 before mentioned, then around another idler supported in brackets 92 before mentioned and then back in contact with and rotating pulleys 36 thereby rotating rollers 34 and thence back to pulley 84 as mentioned. Thus as the carrier wheel presents the cups to be filled with shreds to form biscuits it brings the cups into contact with the belts as above described which revolve the cups all the time that they are receiving the shreds.

The hoppers 30 are connected to back flange plate 118 held down to ring 29 by rods 37 and this plate 118 prevents the discharge of the shreds from the delivery belt 109 beyond the hopper 30.

What I claim is:

1. In a machine of the class described, the combination of movable forms or molds in which the biscuits are molded, a carrier for the forms, devices for revolving the forms while in the carrier, a source of supply of the shreds delivering to the forms or molds, hoppers directing the shreds from the source of supply into the forms or molds, circular packing plungers for forcing the shreds into the forms, cutting devices for cutting the shreds between the hoppers and forms, packing plungers for giving shape to the biscuits after the required mass of shreds has been delivered to the forms, and discharging devices for discharging the forms containing the biscuits from the carrier.

2. In a machine of the class described, the combination of movable forms or molds in which the biscuits are molded, a carrier for the forms, devices for revolving the forms while in the carrier, a source of supply of the shreds delivering to the forms or molds, hoppers directing the shreds from the source of supply into the forms of molds, packing plungers for forcing the shreds into the forms, cutting devices for cutting the shreds between the hoppers and forms, packing plungers for giving shape to the biscuits after the required mass of shreds have been delivered to the forms, and discharging devices for discharging the forms containing the biscuits from the carrier.

3. The combination of forms for the biscuits to be made, a carrier for the forms, devices for automatically delivering the forms to the carrier, devices for giving the carrier an intermittent motion, a source of supply for the shreds, devices engaging the forms on the bottom and two sides to revolve them during the filling, reciprocating packing plungers for packing the shreds in the forms, reciprocating cutting plungers for cutting the shreds from the source of supply, and devices for removing the forms from the carrier.

4. The combination of molds for receiving the shreds, a carrier for the molds, hoppers mounted to move in time with the carrier for directing the shreds into the molds, reciprocating packing plungers passing down through the hoppers and packing the material into the molds, reciprocating cutting plungers for cutting the shreds between the molds, and discharging devices for removing the molds from the carrier.

5. The combination of a mold carrier, hoppers mounted to move with the carrier, and division walls between the molds adapted to coact with a reciprocating plunger in cutting the shreds between the molds.

6. The combination of, a mold carrier, a series of hoppers adapted to move with the carrier and direct the supply of shreds to the molds, division walls between the hoppers adapted to coact with a reciprocating cutting plunger for cutting the shreds between the hoppers, and reciprocating plungers forcing the material into the molds simultaneously with the cutting of the shreds between the molds.

7. The combination of a carrier holding molds or pockets into which the shreds are deposited, division walls between the molds on the carrier, means for packing the material into the molds of the carrier, and reciprocating cutting plungers cutting the material at the division walls between the molds and means for revolving the molds.

8. The combination of a carrier wheel having pockets or receptacles for receiving material to be handled, devices for moving the carrier wheel intermittingly, locking devices for locking the wheel in exact registration at each impulse of movement, reciprocating packing plungers engaging the material in the pockets at each impulse of the wheel, and cutting devices for cutting the material between the pockets at the time that the wheel is at rest.

9. The combination of, a carrier for forms, said carrier provided with a seat for each form, each seat adapted to revolve and carry the form with it, rolls mounted adjacent to the seat and adapted to engage the form on the seat and assist in revolving the same, a source of supply for the material and means for moving the carrier with the forms across the source of supply.

10. The combination, of a carrier for forms, seats upon the carrier for holding the forms, said seats adapted to be revolved, rollers engaging the forms on the seats, and belts for revolving the rollers and forms.

11. The combination of a carrier for forms, seats upon the carrier for holding the forms and adapted to be revolved, rollers adapted to revolve the forms upon the carrier, belts for driving the rollers, seats and the forms, and reciprocating packing plungers for packing the material in the forms while the same are upon the seats.

12. The combination of a carrier carrying forms across a source of supply of material, reciprocating packing plungers packing the material while it is coming from the source of supply and reciprocating cutting plungers for cutting the material between the forms, said packing and cutting plungers mounted upon the same moving cross head substantially as shown.

13. The combination of, a seat for holding a form, two rollers located above the seat and adjacent thereto whereby the said rollers may act upon a form located upon the seat, a belt passing on one side of the seat and engaging the seat and form located thereon and thereby holding the form back against the rollers, pulleys on the shafts of the rollers, a belt for driving the pulleys, and means for driving the belts.

14. The combination of a seat for holding a form, two rollers located above the seat and adjacent thereto whereby the said rollers may act upon a form located upon the seat, a belt passing on one side of the seat and engaging the seat and form located thereon and thereby holding the form back against the rollers, pulleys on the shafts of the rollers and a belt for driving the pulleys, means for driving the belts, and reciprocating packing plungers for packing the material in the forms.

15. The combination of a seat for holding a form, two rollers located above the seat and adjacent thereto whereby the said rollers may act upon a form located upon the seat, a belt passing on one side of the seat and engaging the seat and form located thereon and thereby holding the form back against the rollers, pulleys on the shafts of the rollers and a belt for driving the pulleys, means for driving the belts, reciprocating packing plungers for packing the material in the forms, and reciprocating cutting plungers for cutting the material between the forms.

16. The combination of a seat for holding a form, two rollers located above the seat and adjacent thereto whereby the said rollers may act upon a form located upon the seat, a belt passing on one side of the seat and engaging the seat and form located thereon and thereby holding the form back against the rollers, pulleys on the shafts of the rollers and a belt for driving the pulleys, means for driving the belts, reciprocating packing plungers for packing the material in the forms, reciprocating cutting plungers for cutting the material between the forms, and an ejecting device for removing the forms from the carrier.

17. The combination of a carrier for carrying movable forms across or past a point of delivery of the shreds, seats upon the carrier for holding movable forms, said seats adapted to revolve and hold a single form, fingers moving with the carrier and separating the forms from each other, rollers mounted adjacent to the seats one for each form but located on a line between the seats and forms and of such diameter that each roller is adapted to engage two forms one on each adjacent seat, and means for revolving the seats and the rollers and thereby the forms.

18. The combination of a carrier for carrying movable forms across or past a point of delivery of the shreds, seats upon the carrier for holding movable forms, said seats adapted to revolve and hold a single form, fingers moving with the carrier and separating the forms from each other, rollers mounted adjacent to the seats one for each form but located on a line between the seats and forms and of such diameter that each roller is adapted to engage two forms one on each adjacent seat, means for revolving the seats and the rollers and thereby the forms, and means for packing the material in the forms and for cutting it between the forms.

19. The combination of a carrier for carrying movable forms across or past a point of delivery of the shreds, seats upon the carrier for holding movable forms, said seats adapted to revolve and hold a single form, fingers moving with the carrier and separating the forms from each other, rollers mounted adjacent to the seats one for each form, but located on a line between the seats and forms and of such diameter that each roller is adapted to engage two forms one on each adjacent seat, means for revolving the seats and the rollers and thereby the forms, means for packing the material in the forms and for cutting it between the forms, and means for ejecting the forms from the carrier.

20. The combination of a carrier carrying forms that are to give shape to the biscuits, seats carried with the carrier for holding the forms, means for revolving the seats and forms, fingers moving with the carrier for separating the forms from each other, hoppers moving with the carrier for directing the material into the forms, and reciprocating packing plungers for packing the material into the forms.

21. The combination of a carrier carrying forms that are to give shape to the biscuits seats carried with the carrier for holding the forms, means for revolving the seats and forms, fingers moving with the carrier for separating the forms from each other, hoppers moving with the carrier for directing the material into the forms, reciprocating packing plungers for packing the material into the forms, and reciprocating cutting plungers for cutting the material between the forms.

22. The combination of a carrier carrying forms that are to give shape to the biscuits, seats carried with the carrier for holding the forms, means for revolving the seats and forms, fingers moving with the carrier for separating the forms from each other, hoppers moving with the carrier for directing the material into the forms, reciprocating packing plungers for packing the material into the forms, reciprocating cutting plungers for cutting the material between the forms, and devices for ejecting the filled forms from the machine.

23. The combination of a carrier carrying forms that are to give shape to the biscuits, seats carried with the carrier for holding the forms, means for revolving the seats and forms, fingers moving with the carrier for separating the forms from each other, hoppers moving with the carrier for directing the material into the forms, reciprocating packing plungers for packing the material into the forms, reciprocating cutting plungers for cutting the material between the forms, devices for ejecting the filled forms from the machine, with means for giving the carrier an intermittent motion.

24. The combination of a carrier carrying forms, that are to give shape to the biscuits, seats carried with the carrier for holding the forms, means for revolving the seats and forms, fingers moving with the carrier for separating the forms from each other, hoppers moving with the carrier for directing the material into the forms, reciprocating packing plungers for packing the material into the forms, reciprocating cutting plungers for cutting the material between the forms, devices for ejecting the filled forms from the machine, with means for giving the carrier an intermittent motion, said revolving means for the seats and forms revolving the same all the time that the forms are filling.

25. The combination of a carrier carrying forms to be filled across a source of supply of the shreds, hoppers located above the source of supply, division walls between the hoppers, and reciprocating cutting plungers composed of two members adapted to embrace the division wall on each side simultaneously and thereby strip the material from each side of the division wall.

26. The combination of a carrier carrying forms to be filled across a source of supply of the shreds, hoppers located above the source of supply, division walls between the hoppers, reciprocating cutting plungers composed of two members adapted to embrace the division wall on each simultaneously and thereby strip the material from each side of the division wall, and reciprocating packing plungers acting on the material simultaneously with the cutting.

27. The combination of a carrier carrying forms to be filled across a source of supply of the shreds, hoppers located above the source of supply division walls between the hoppers, reciprocating cutting plungers composed of two members adapted to embrace the division wall on each side simultaneously and thereby strip the material from each side of the division wall, and guide blocks located on the plates of the cutting plungers whereby close registration with the division walls of the hoppers is secured.

28. The combination of a carrier carrying forms to be filled across a source of supply of the shreds, hoppers located above the source of supply division walls between the hoppers, reciprocating cutting plungers composed of two members adapted to embrace the division wall on each side simultaneously and thereby strip the material from each side of the division wall, and a stripper block for stripping the material from the plungers when the same retreat from the cutting.

29. The combination of forms to be filled, a source of supply for filling the material into the forms, a reciprocating cutting plunger for cutting the material between the forms, and a stripper for stripping the material from the cutting plunger which stripper is held normally out of action by a spring but is actuated positively at the upward limit of the plunger.

30. The combination of forms for receiving the material, a source of supply of the material, plungers for packing the material into the forms mounted in a manner to apply an elastic impact to the material, and plungers for cutting the material between the forms.

31. The combination of forms for receiving the material, a source of supply of the material, plungers for packing the material into the forms mounted in a manner to apply an elastic impact to the material, plungers for cutting the material between the forms, and hoppers for directing the material to the forms.

32. The combination of forms for receiving the material, a source of supply of the material, plungers for packing the material into the forms mounted in a manner to apply an elastic impact to the material, plungers for cutting the material between the forms, hoppers for directing the material to the forms, and means for revolving the forms.

33. The combination of forms for receiving the material, a source of supply of the material, plungers for packing the material into the forms mounted in a manner to apply an elastic impact to the material, plungers for cutting the material between the forms, hoppers for directing the material to the forms, and means for revolving the forms, said packing plungers made cylindrical and engaging the material on all sides of the form at the same time.

34. The combination of forms for receiving the shreds, a carrier for the forms, means for revolving the forms, packing plungers for packing the material in the forms, said plungers mounted to give an elastic impact to the material in the forms, said plungers made cylindrical in form, whereby they act on all sides of the material simultaneously.

35. The combination of forms for receiving the shreds, a carrier for the forms, means for revolving the forms, packing plungers for packing the material in the forms, said plungers mounted to give an elastic impact to the material in the forms, said plungers made cylindrical in form whereby they act on all sides of the material simultaneously, and reciprocating cutting devices for cutting the material between the forms.

36. The combination of forms for receiving the shreds, a carrier for the forms, means for revolving the forms, packing plungers for packing the material in the forms, said plungers mounted to give an elastic impact to the material in the forms, said plungers made cylindrical in form whereby they act on all sides of the material simultaneously, reciprocating cutting devices for cutting the material between the forms, with devices for discharging the forms from the carrier.

37. The combination of a carrier carrying forms to be filled, a source of supply of material, devices for giving the carrier an intermittent motion, devices for locking the carrier at each impulse of motion with a brake for preventing excess movement of the carrier.

38. The combination of a carrier wheel for carrying forms to be filled, a source of supply of shreds, a ratchet movement for moving the wheel, a locking device for preventing excess movement of the wheel, reciprocating plungers for packing the material in the forms, and reciprocating cutting plungers for cutting the material between the forms.

39. The combination of a carrier wheel for carrying forms to be filled, a source of supply of shreds a ratchet movement for moving the wheel, a locking device for preventing excess movement of the wheel, reciprocating plungers for packing the material in the forms, reciprocating cutting plungers for cutting the material between the forms, and a discharging device for removing the forms from the carrier.

40. The combination of a vertical shaft, a carrier for forms carried by the vertical shaft, a horizontal shaft to which is applied the source of power, a ratchet wheel on the vertical shaft and a pawl moved by the horizontal shaft for moving the ratchet and vertical shaft and carrier, and cutting plungers mounted upon the vibrating cross head.

41. The combination of a vertical shaft, a carrier for forms carried by the vertical shaft, a horizontal shaft to which power is applied, a ratchet wheel on the vertical shaft and a pawl moved by the horizontal shaft for moving the ratchet and vertical shaft and carrier, cutting plungers mounted upon the vibrating cross head, and means for revolving the forms carried by the carrier.

42. The combination of a vertical shaft, a carrier for forms carried by the vertical shaft, a horizontal shaft to which power is applied, a ratchet wheel on the vertical shaft and a pawl moved by the horizontal shaft for moving the ratchet and vertical shaft and carrier, cutting plungers mounted upon the vibrating cross head, and a secondary vertical shaft actuated from the horizontal shaft for revolving the forms carried by the carrier.

43. The combination of a vertical shaft, a carrier for forms carried by the vertical shaft, a power driven horizontal shaft, a ratchet wheel on the vertical shaft and a pawl moved by the horizontal shaft for moving the ratchet and vertical shaft and carrier, cutting plungers mounted upon the vibrating cross head, a secondary vertical shaft actuated from the horizontal shaft for revolving the forms carried by the carrier, and pulleys and belts driven from the secondary shaft for revolving the forms.

44. The combination of a vertical shaft, a carrier for forms carried and moved by the shaft, fingers division walls or pockets on the carrier for separating the forms, means for giving the vertical shaft and carrier an intermittent motion, means for locking the same at determined point, a source of supply for the material to be filled into the forms, and means for cutting the material between the forms.

45. The combination of a vertical shaft, a carrier for forms carried and moved by the shaft, fingers division walls or pockets on the carrier for separating the forms, means for giving the vertical shaft and carrier an intermittent motion, means for locking the same at determined points, a source of supply for the material to be filled into the forms, means for cutting the material between the forms, and means for ejecting the forms from the carrier.

46. The combination of a vertical shaft, a carrier for forms carried and moved by the shaft, fingers division walls or pockets on the carrier for separating the forms, means for giving the vertical shaft and carrier an intermittent motion, means for locking the same at determined points, a source of supply for the material to be filled into the forms, means for cutting the material between the forms and means for revolving the forms while being filled.

47. The combination of a vertical shaft, a carrier for forms carried and moved by the shaft, fingers division walls or pockets on the carrier for separating the forms, means for giving the vertical shaft and carrier an intermittent motion, means for locking the same at determined point, a source of supply for the material to be filled into the forms, means for cutting the material between the forms, means for revolving the forms while being filled, and means for ejecting the forms from the carrier.

48. The combination of a carrier for carrying movable forms a source of supply for the forms, a source of supply for the material to be filled into the carrier forms, means for revolving the forms, while receiving the material, said revolving means actuating the forms during a part only of the time that said forms are in the carrier and said revolving means composed of belts that are automatically engaged and disengaged by the movement of the carrier, with a fixed arm discharging the forms automatically by the movement of the carrier when the same arrives at a given point of its carriage.

49. The combination of a carrier wheel for forms, actuated and carried by a vertical shaft, a horizontal driving shaft connected to drive the vertical shaft and wheel through the medium of a ratchet and pawl movement, a rocker shaft driven by the horizontal shaft for driving the ratchet and pawl movement of the vertical shaft, locking devices connected to the rocker shaft for locking and unlocking the carrier wheel as driven by the ratchet movement.

50. The combination of a carrier wheel for forms actuated and carried by a vertical shaft, a horizontal driving shaft connected to drive the vertical shaft and wheel through the medium of a ratchet and pawl movement, a rocker shaft driven by the horizontal shaft for driving the ratchet and pawl movement of the vertical shaft, locking devices connected to the rocker shaft for locking and unlocking the carrier wheel as driven by the ratchet movement, and a secondary rocker shaft driven from the horizontal shaft for actuating a reciprocating cross head carrying packing plungers adapted to engage the material in the forms carried by the carrier.

51. The combination of a horizontal carrier for forms, composed of a wheel, a vertical shaft mounted in a suitable frame for carrying the wheel, hoppers mounted upon the wheel and moving therewith, revolving seats mounted below the hoppers and carried with the wheel, and a belt mounted to engage a section of said wheel's periphery and revolve the forms by the movement of the belt, said belt engaging successively the forms as the same are brought in contact with it by the movement of the wheel.

52. The combination of a horizontal carrier for forms composed of a wheel a vertical shaft mounted in a suitable frame for carrying the wheel, hoppers mounted upon the wheel and moving therewith, revolving seats mounted below the hoppers and carried with the wheel a belt mounted to engage a section of said wheel's periphery and revolve the forms by the movement of the belt, said belt engaging successively the forms as the same are brought in contact with it by the movement of the wheel, and a discharge mechanism for discharging the forms from the wheel by the movement of the wheel.

53. The combination of a horizontal carrier for forms composed of a wheel, a vertical shaft mounted in a suitable frame for carrying the wheel, hoppers mounted upon the wheel and moving therewith, revolving seats mounted below the hoppers and carried with the wheel a belt mounted to engage a section of said wheel's periphery and revolve the forms by the movement of the belt, said belt engaging successively the forms as the same are brought in contact with it by the movement of the wheel, and reciprocating packing plungers packing the material out of the hoppers into the forms.

54. The combination of a horizontal carrier for forms composed of a wheel, a vertical shaft mounted in a suitable frame for carrying the wheel, hoppers mounted upon the wheel and moving therewith, revolving seats mounted below the hoppers and carried with the wheel a belt mounted to engage a section of said wheel's periphery and revolve the forms by the movement of the belt, said belt engaging successively the forms as the same are brought in contact with it by the movement of the wheel, reciprocating packing plungers packing the material out of the hoppers into the forms, and reciprocating cutting plungers for cutting the material between the forms.

55. The combination of a horizontal carrier for forms composed of a wheel, a vertical shaft mounted in a suitable frame for carrying the wheel, hoppers mounted upon the wheel and moving therewith, revolving seats mounted below the hoppers and carried with the wheel a belt mounted to engage a section of said wheel's periphery and revolve the forms by the movement of the belt, said belt engaging successively the forms as the same are brought in contact with it by the movement of the wheel, reciprocating packing plungers packing the material out of the hoppers into the forms, and reciprocating cutting plungers for cutting the material between the forms.

In witness whereof I have hereunto signed my name on this 23rd day of January, 1908.

WILLIAM ERASTUS WILLIAMS.

Witnesses:
JOHN GRANT,
R. ROPER.